(12) United States Patent
Ryznar et al.

(10) Patent No.: US 9,965,897 B2
(45) Date of Patent: May 8, 2018

(54) EYEWEAR OPERATIONAL GUIDE SYSTEM AND METHOD

(71) Applicant: OPS Solutions LLC, Novi, MI (US)

(72) Inventors: Paul Ryznar, Northville, MI (US); William T. Sommerville, Lake Orion, MI (US)

(73) Assignee: OPS Solutions, LLC, Wixom, MI (US)

( * ) Notice: Subject to any disclaimer, the term of this patent is extended or adjusted under 35 U.S.C. 154(b) by 0 days. days.

(21) Appl. No.: 14/903,955

(22) PCT Filed: Jul. 8, 2014

(86) PCT No.: PCT/US2014/045765
§ 371 (c)(1),
(2) Date: Jan. 8, 2016

(87) PCT Pub. No.: WO2015/006334
PCT Pub. Date: Jan. 15, 2015

(65) Prior Publication Data
US 2016/0171772 A1 Jun. 16, 2016

Related U.S. Application Data

(60) Provisional application No. 61/843,659, filed on Jul. 8, 2013.

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS

| 2,682,117 A | 6/1954 | Wales |
| 3,600,785 A | 8/1971 | Cook |

(Continued)

FOREIGN PATENT DOCUMENTS

| DE | 10320557 A1 | 12/2004 |
| JP | 2004206484 A | 7/2004 |

(Continued)

OTHER PUBLICATIONS

International Search Report and Written Opinion completed Nov. 20, 2014, from corresponding International Application No. PCT/US2014/045765.

(Continued)

*Primary Examiner* — Edward Martello
(74) *Attorney, Agent, or Firm* — Gardner, Linn, Burkhart and Ondersma, LLP

(57) ABSTRACT

A guide system for guiding actions of an individual includes a guide system controller and a head wearable display device that includes a display that is viewable by an individual wearing the device. An information signal from the controller to the head wearable display device generates a visual image on the display corresponding to the information signal that is viewable by the individual, with the visual image providing guidance to the wearer to perform an action and the display being generally transparent and the visual image electronically generated and virtually over laid on a physical object or surface when viewed through the display. Upon completion of an action associated with the visual image, a confirmation signal is provided to the controller.

20 Claims, 10 Drawing Sheets

(51) Int. Cl.
*G02B 27/00* (2006.01)
*G06F 1/16* (2006.01)
*G06F 3/01* (2006.01)
*G06F 3/0346* (2013.01)
*G09G 5/00* (2006.01)

(52) U.S. Cl.
CPC .............. *G06F 1/163* (2013.01); *G06F 3/011* (2013.01); *G06F 3/012* (2013.01); *G06F 3/013* (2013.01); *G06F 3/0346* (2013.01); *G09G 5/006* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 3,623,066 A | 11/1971 | Norris | |
| 3,667,104 A | 6/1972 | Chamillard et al. | |
| 3,986,244 A | 10/1976 | Latanzi | |
| 4,102,568 A | 7/1978 | Miyagi | |
| 4,163,309 A | 8/1979 | Stuckler | |
| 4,222,036 A | 9/1980 | Troukens | |
| 4,318,222 A | 3/1982 | Frohlich | |
| 4,469,553 A | 9/1984 | Whitehead | |
| 4,890,382 A | 1/1990 | Anderson et al. | |
| 5,119,536 A | 6/1992 | Leitz et al. | |
| 5,341,183 A | 8/1994 | Dorsey-Palmateer | |
| 5,430,662 A | 7/1995 | Ahonen | |
| 5,506,641 A | 4/1996 | Dorsey-Palmateer | |
| 5,801,946 A | 9/1998 | Nissen et al. | |
| 5,910,894 A | 6/1999 | Pryor | |
| 6,000,801 A | 12/1999 | Dillon et al. | |
| 6,036,319 A | 3/2000 | Rueb et al. | |
| 6,170,163 B1 | 1/2001 | Bordignon et al. | |
| 6,224,385 B1 | 5/2001 | Nitta et al. | |
| 6,317,980 B2 | 11/2001 | Buck, III | |
| 6,600,476 B2 | 7/2003 | Mathis et al. | |
| 6,658,218 B2 | 12/2003 | Krolczyk et al. | |
| 7,027,886 B2 | 4/2006 | Hoppes et al. | |
| 7,193,696 B2 | 3/2007 | Engelbart et al. | |
| 7,268,893 B2 | 9/2007 | Palmateer | |
| 7,433,796 B2 | 10/2008 | Behan et al. | |
| 7,463,368 B2 | 12/2008 | Morden et al. | |
| 7,515,981 B2 | 4/2009 | Ryznar et al. | |
| 8,751,049 B2 | 6/2014 | Linder et al. | |
| 2003/0073541 A1 | 4/2003 | Carlson | |
| 2004/0111901 A1 | 6/2004 | Newcomer | |
| 2006/0059699 A1 | 3/2006 | Krantz | |
| 2006/0106483 A1 | 5/2006 | Behan et al. | |
| 2006/0185181 A1 | 8/2006 | Long et al. | |
| 2007/0180674 A1 | 8/2007 | Morden et al. | |
| 2008/0121168 A1* | 5/2008 | Ryznar ............ G05B 19/41805 116/201 |
| 2012/0183137 A1* | 7/2012 | Laughlin ................ H04N 7/185 380/200 |
| 2012/0194418 A1* | 8/2012 | Osterhout .......... G02B 27/0093 345/156 |
| 2013/0044042 A1 | 2/2013 | Olsson et al. | |

FOREIGN PATENT DOCUMENTS

| | | |
|---|---|---|
| JP | 2009279193 A | 12/2009 |
| JP | 2010250415 A | 11/2010 |

OTHER PUBLICATIONS

Thesis entitled, LuminAR: A Compact and Kinetic Projected Augmented Reality Interface by Natan Linder, completed Aug. 12, 2011.
Assembly Guidance System Inc.'s Laserguide brochure, publication date unknown.
Assembly Guidance System Inc.'s Laserguide Productivity and Flexibility brochure, publication date unknown.
Assembly Guidance System Inc.'s About Laser Projection Webpage, indicated to have been published Nov. 2004.

* cited by examiner

Pre-assemble
\> <
FIG. 1A
Select
FIG. 1B
Insert
FIG. 1C
Assemble
FIG. 1D
Pick
FIG. 1E
Gauge
FIG. 1F
Torque
FIG. 1G
← Left
FIG. 1H
Right →
FIG. 1I
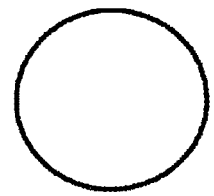
FIG. 1J
FIG. 1K
FIG. 1L

EYEWEAR OPERATIONAL GUIDE SYSTEM AND METHOD

CROSS REFERENCE TO RELATED APPLICATION

The present application claims priority of U.S. provisional application Ser. No. 61/843,659 filed Jul. 8, 2013, which is hereby incorporated herein by reference in its entirety.

BACKGROUND OF THE INVENTION

The present invention is directed to a guide system for providing augmented reality visual indicators overlaid with the actual environment to guide actions of an individual in addition to confirmation that each step was properly completed, and in particular to a guide system utilizing a head wearable display device with confirmation capability from the head wearable device or other inputs.

SUMMARY OF THE INVENTION

The present invention provides an eyewear operational guide system for providing visual indicators to a wearer of a head wearable display device to guide actions of the individual in addition to confirming that each step of a process was properly completed.

According to an aspect of the present invention, a method of guiding actions of an individual comprises providing a guide system having a guide system controller and a head wearable display device that includes a display that is viewable by an individual wearing the head wearable display device. An information signal is provided from the guide system controller to the head wearable display device, with a visual image then being presented on the display corresponding to the information signal. Other features include seamlessly importing a CAD drawing that virtually locks onto the real environment to dynamically guide the operator to perform manual processes within the augmented reality environment that correspond to the same locations and operations within the CAD drawing environment while anticipating the next step through separate visual indicators to the operator.

The method further includes providing a confirmation signal to the guide system controller upon completion of an action by the wearer, wherein the confirmation signal may be provided via an action taken by the wearer or by a sensor, such as a vision system, detecting completion of an action. Multiple head wearable display devices may be provided to provide simultaneous guiding of actions by multiple wearers. In such an embodiment information signals may be provided to the devices to divide the actions between the individuals and/or based on qualifications of the individuals. The system may further include a vision system for detecting nonconformities, with the system providing visual images to a wearer to direct correction of a detected nonconformity.

According to another aspect of the present invention, a guide system adapted to provide visual indicators to an individual to guide actions comprises a head wearable display device that includes a display and a camera, and with the camera being operable to capture images, such as photos or videos, of the individual's field of view. A guide system controller is operable to provide an information signal to the head wearable display device, with the display presenting a visual image corresponding to the information signal that is viewable by the individual.

Various images may be provided to a wearer, such as a geometrical outline image, a nonconformity indicia image, a guided route image and a virtual pushbutton image. Still further, a separate or remote light projector device may be used to project any of a geometrical outline image, a nonconformity indicia image, a guided route image and a virtual pushbutton image independently of the use of a head wearable display device.

The present guide system provides a cost effective and accurate method of guiding an individual or individuals through one or more tasks or actions, and provides confirmation that the actions have been completed as required. The guide system is useful in a wide array of applications, such as assembly, packaging, inspection and the like. These and other objects, advantages, purposes and features of this invention will become apparent upon review of the following specification in conjunction with the drawings.

BRIEF DESCRIPTION OF THE DRAWINGS

FIGS. 1A-1L illustrate exemplary images that may be generated by a head wearable display and computing device;

DESCRIPTION OF THE PREFERRED EMBODIMENTS

Figure 1:
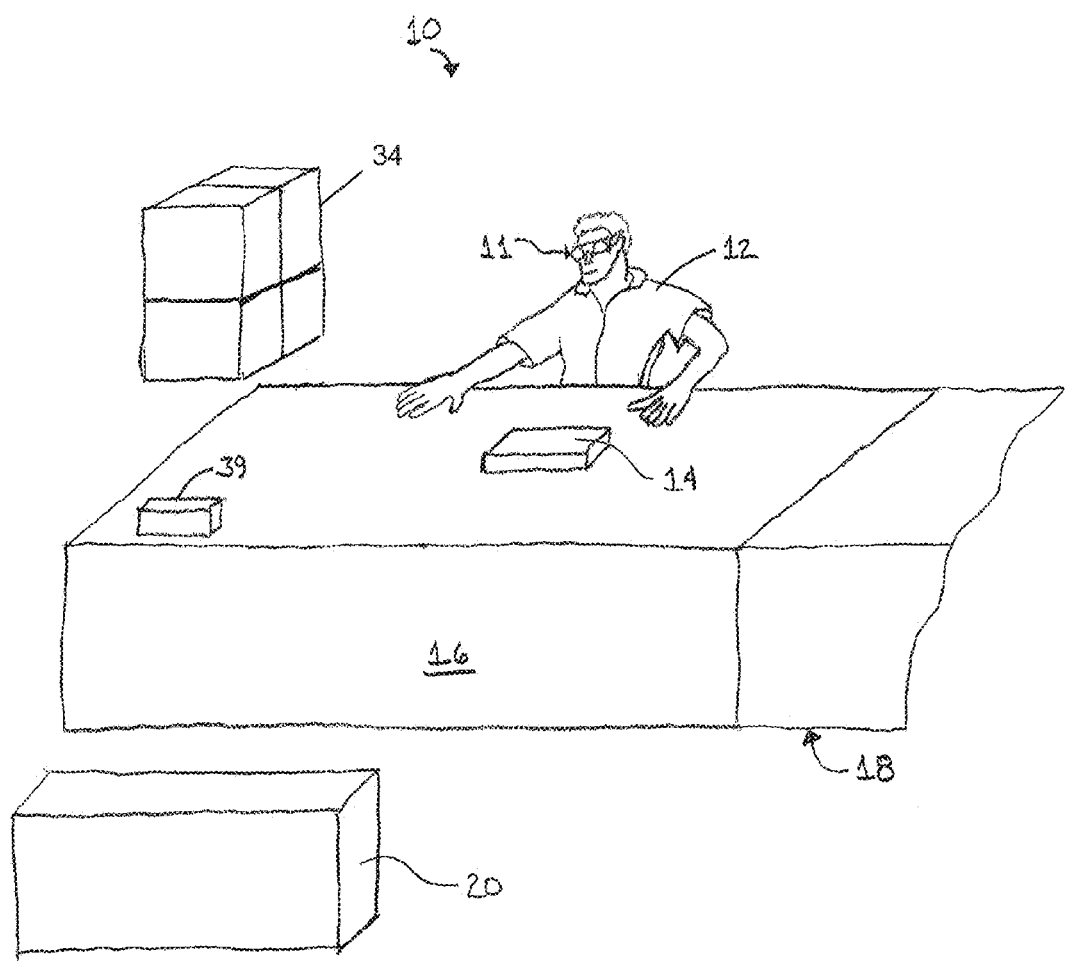
FIG. 1 is a perspective view of an eyewear operational guide system in accordance with the present invention configured to guide actions at a manual work station such as an assembly line.

The present invention will now be described with reference to the accompanying figures, wherein the numbered elements in the following written description correspond to like-numbered elements in the figures. As illustrated in FIG. 1, an eyewear operational guide system 10 is shown that employs a head wearable display device 11 that is wearable by an individual 12, such as an operator at a workstation 16, where device 11 includes a display 13 (FIG. 2) for providing visual information to individual 12, such as to guide the activities of individual 12. Guide system 10 further includes a controller or control module 20 that wirelessly communicates with device 11, or may alternatively be wired to device 11, to provide and/or assist in the providing of visual information to individual 12. Accordingly, guide system 10, via eyewear device 11, may be utilized to provide visual information and thereby guide individual 12 regarding operational steps being performed on an object, such as a work piece 14, such as may be performed as part of the work done on piece 14 along assembly line 18. Still further, as discussed below, guide system 10 may include, incorporate, be part of or interface with a guide system employing light projectors and standalone displays such as in connection with guide systems disclosed in U.S. Pat. No. 7,515,981, U.S. Pat. App. Pub. No. US 2013/0325155 and International Pub. No. WO 2012/109593, which are hereby incorporated herein by reference in their entireties.

Figure 2:
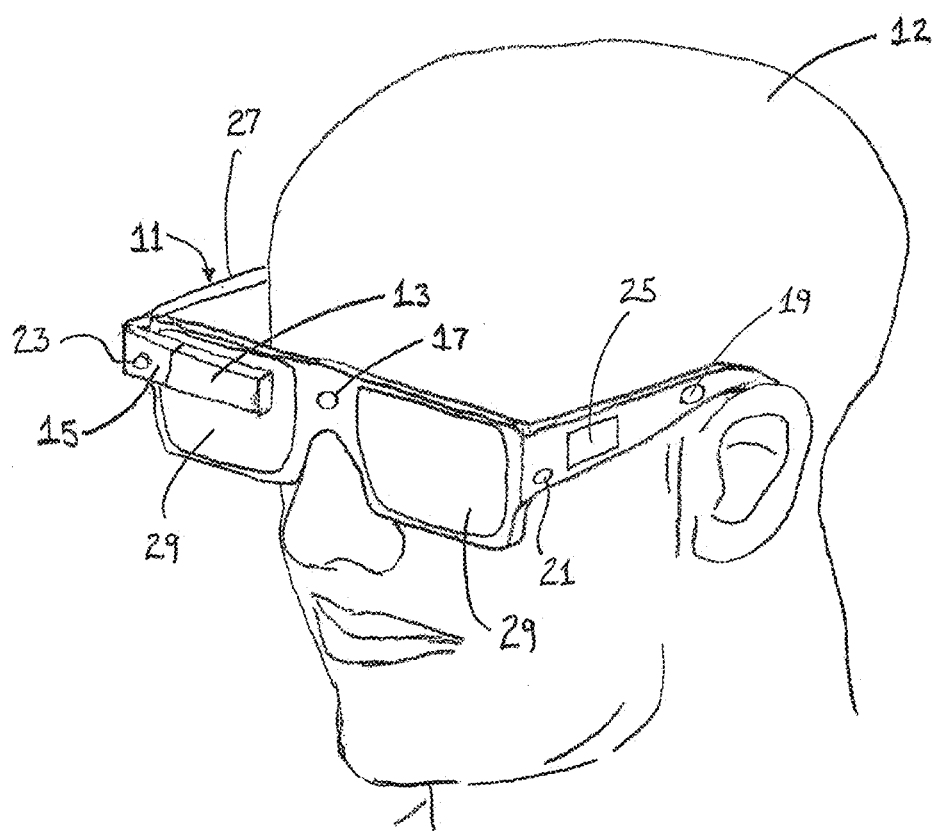
FIG. 2 is a perspective view of an individual wearing a head wearable display and computing device.

Referring to FIG. 2, head wearable display device 11 may (or may not) include a projector 15 associated with display 13, with projector 15 operable to form images on display 13, such as text, drawings, images, videos and/or other alphanumeric imagery in a desired shape, pattern or form, otherwise referred to as a graphic display or visual display feature ("VDF"), as discussed below. A head wearable display device may alternatively form images directly on a lens portion of the device, in which case the lens may form the display. One or more cameras 17 are included for imaging the field of view seen by individual 12 when wearing eyewear device 11, where the imaging may comprise the taking of pictures and/or videos via the camera device 17. Device 11 includes a speaker 19 for providing auditory information, such as sounds or words, to individual 12, and includes a microphone 21 that may be operable to provide voice commands to device 11, enable communications with other individuals, or enable the recording of auditory signals.

Various input structures are included to enable communication from individual 12 to device 11, including a button 23 and a touchpad 25 that may be tapped or swiped by individual 12. Such input structures may be used to provide confirmation that a step directed by system 10 has been completed, as discussed in more detail below. Other forms of step confirmation may also be obtained via wearable device 11. For example, a confirmation signal may originate through camera 17, such as via processing of an image or images obtained by camera 17 to accurately compare that an actual action performed by the operator or operators meets the intended standard. A confirmation signal may also be obtained via motion recognition that the proper step was performed as guided by system 10 via device 11, via voice recognition through microphone 21, and/or interfacing through wired or wireless means with other devices such as vision cameras, torque guns, light curtains, bar code scanners, RFID readers, digital measurement devices, PLCs, MES systems, or the like, or even through brain wave detection, tracking eye movement, sensing muscle movement electronically or through other sensors, sensing acceleration or angle using an accelerometer, measuring rotation using a gyroscope, or advancing based on a standard or adaptively calculated time. In a particular embodiment, for example, vocal commands "step ahead" or "step back" may be stated by a wearer and detected via microphone 21 to selectively advance or repeat directional guidance steps.

Figure 1M:
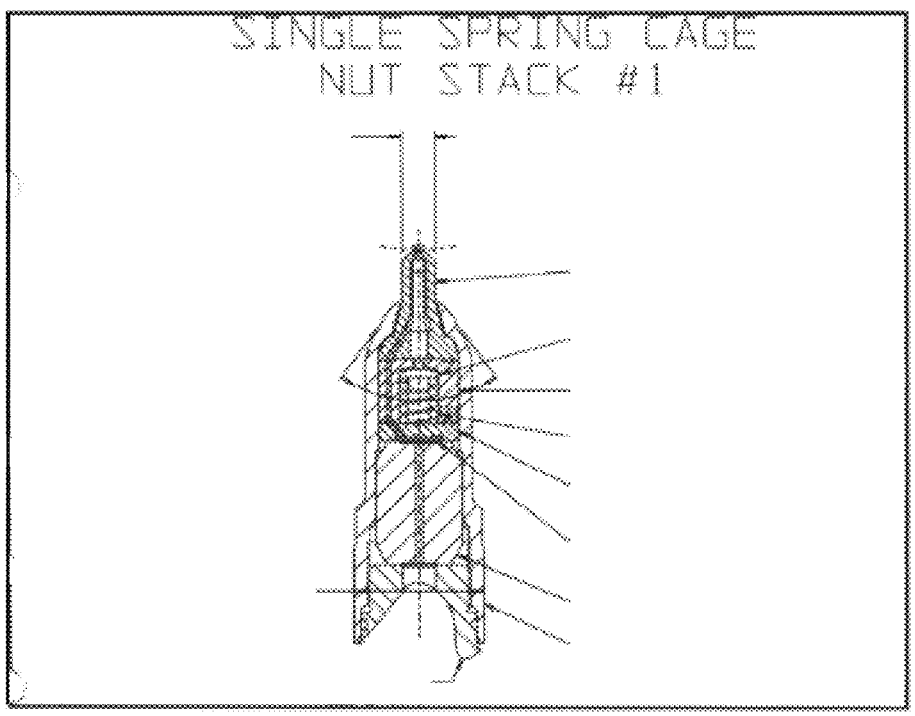
FIG. 1M is an exemplary CAD image that may be generated by a head wearable display and computing device.
Figure 1N:
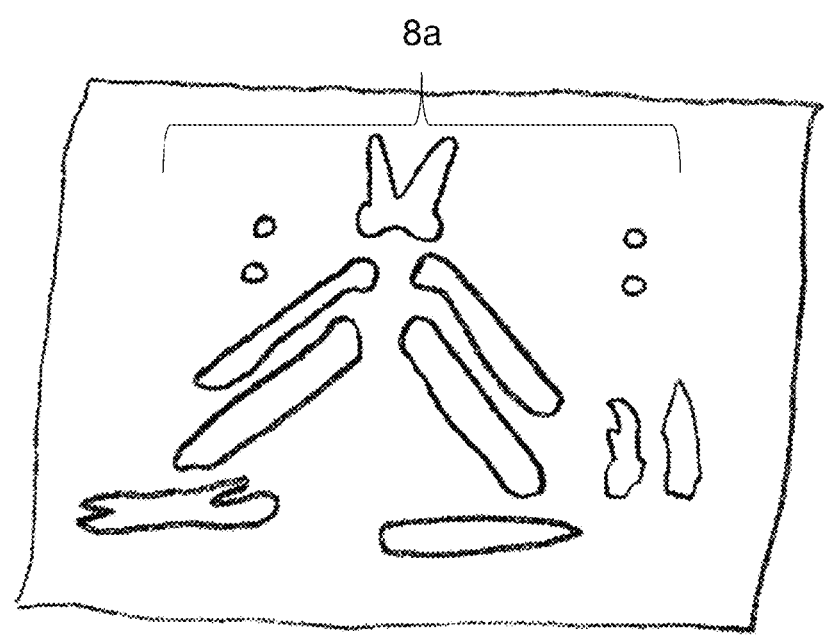
FIG. 1N is an exemplary image of virtual fixturing for parts for assembly into a product that may be generated by a head wearable display and computing device.
Figure 1O:
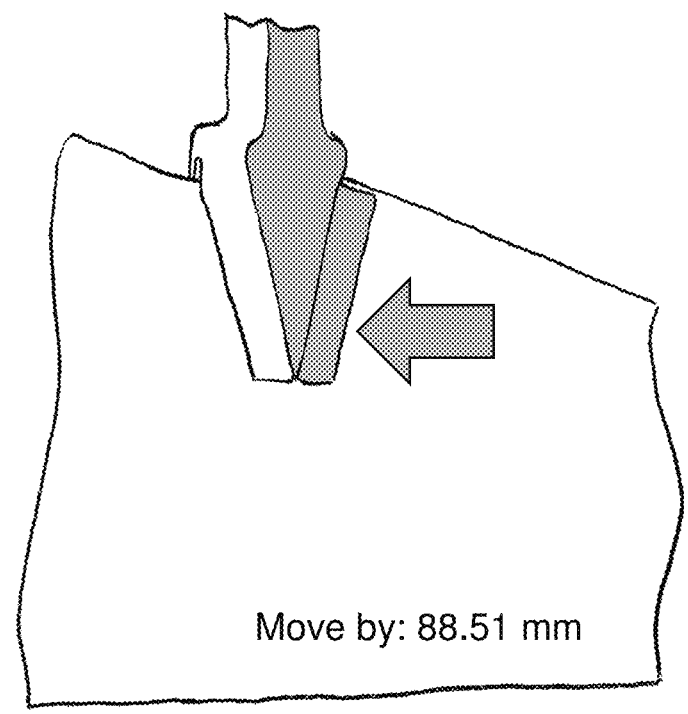
FIG. 1O is an exemplary image of a nonconformity indication that may be generated by a head wearable display and computing device.
Figure 1P:
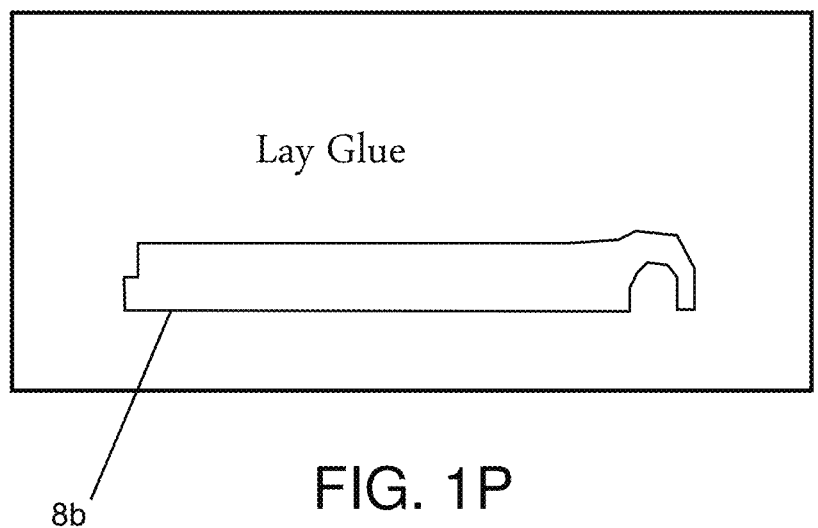
FIG. 1P is an exemplary image of a guided route that may be generated by a head wearable display and computing device.
Figure 1Q:
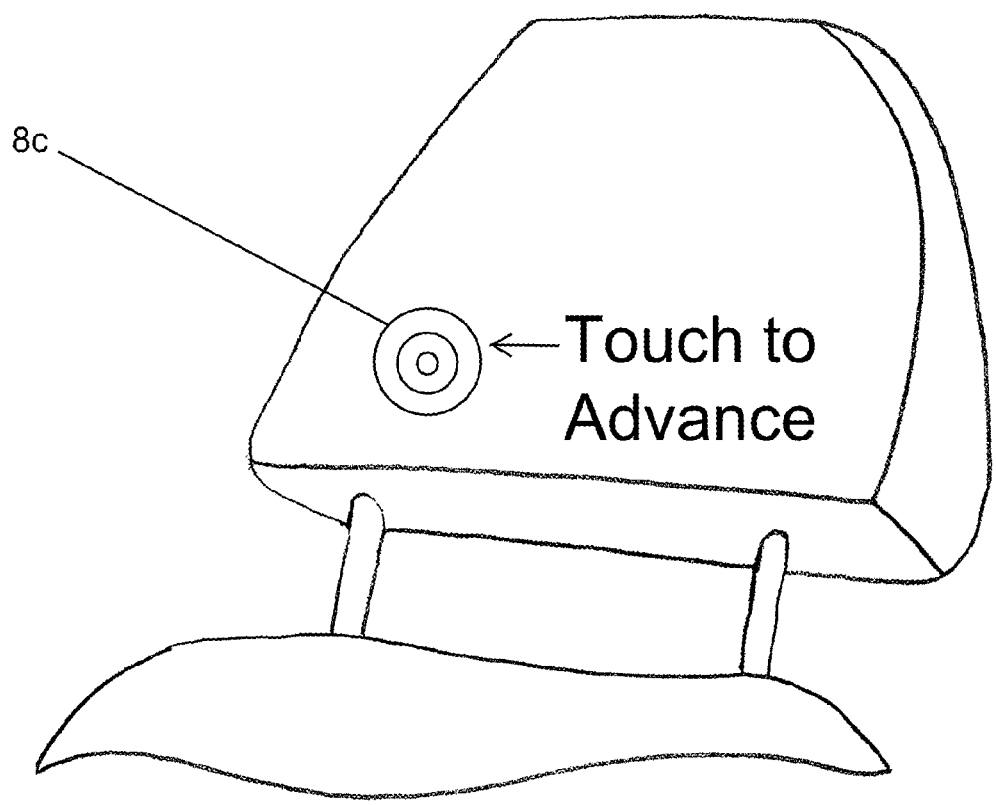
FIG. 1Q is an exemplary image of a virtual pushbutton that may be generated by a head wearable display and computing device.

Device 11 includes a frame 27 and may also include lenses 29. Although not shown, within frame 27 device 11 further includes one or more internal or external processors, batteries, memory storage devices, and antennas, as well as wired or wireless transmitters and receivers such as for Wi-Fi, Zigbee, or Bluetooth communications. Furthermore, the projector 15, or an alternative projector or other form of display technology, may also be used to project visual display features (VDFs) directly onto the workstation and work piece 14, which would lock onto the correct location even if the individual is static or 12 moving. By way of example only, FIGS. 1A-1Q illustrate exemplary images that may be electronically generated by device 11 to be viewable by a wearer 12 of device 11. FIGS. 1A-1L illustrate various indicia, and FIG. 1M discloses a virtual blueprint. FIG. 1N discloses virtual fixturing of components by creating geometrical outline images 8a of the individual components, with an operator then placing into each outline the appropriate part for subsequent assembly. Such geometrical outline images may also or alternatively create outlines of tools or equipment used to assemble a component. System 10 may also be used to direct the appropriate selection of the components that are to be assembled, such as by directing the operator to appropriate parts bins. As discussed below, a vision system can be used to confirm each of the parts has been correctly selected and/or positioned into the geometrical outlines. FIG. 1O discloses a nonconformity image(s) comprising an arrow, text and highlighted regions generated in response to a testing or check of the operator action, such as in response to a vision system, measuring sensor, or other device. FIG. 1P discloses a guided route image 8b such as may be employed for dispensing a glue bead onto an object, laying down a wiring harness, applying a welding bead, wiping down a target area, or the like. FIG. 1Q discloses a virtual pushbutton image 8c and accompanying test, where image 8c is generated on a surface that is within a field of view of a vision system. Upon the operator completing an action, the operator may placing their hand in, on or passing their hand over the generated pushbutton image 8c with the vision system detecting such action for generation of a confirmation signal to either complete the action and/or advance system 10 to the next action. The images generated for an individual may include electronically generated video images depicting motion.

Device 11 may further include various position sensors, such as for detecting the relative orientation of device 11 in three-dimensional space to determine where the wearer is viewing and/or for detecting the global position of the wearer, such as their location within a manufacturing facility or other workplace. Such sensors can include accelerometers, location sensors, such as for triangulation location, micro-electromechanical system gyroscopes, and/or magnetometers. This positional detection can be used to turn on and off certain functions of the device 11 given certain conditions for security and/or other reasons. Certain functions of the device may also be activated or de-activated based on pre-set times of the day. Still further, device 11 may include sensors, such as cameras, photo eyes, motion sensors, or the like, for receiving communication inputs or monitoring individual 12. For example, motion sensors may be employed for receiving motion signals from the wearer, such as by way of movement of the individual's head. Still further, device 11 may detect an operator blinking to provide an input signal, such as by detecting various numbers of blinks in rapid succession to provide an input signal.

Figure 4A:
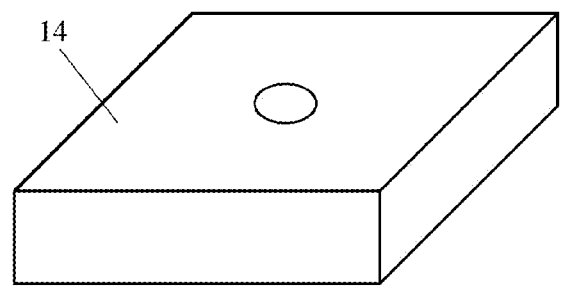
FIG. 4A is an exemplary perspective view of an object upon which an individual may perform operations, such as inspection or installation.
Figure 4B:
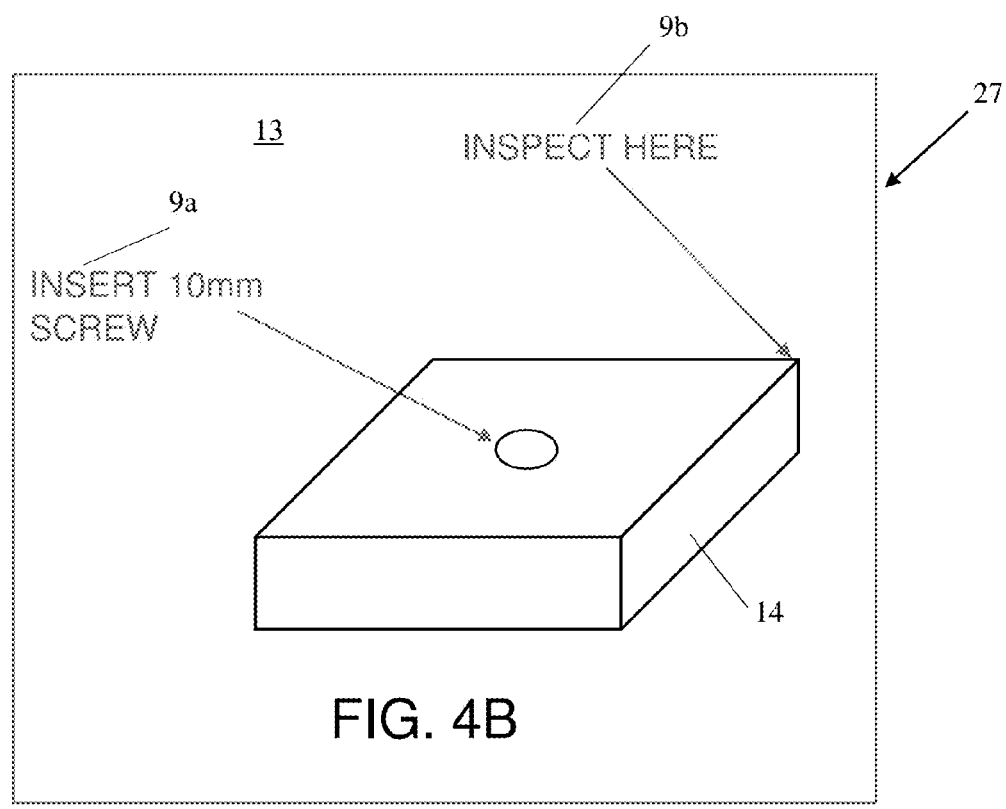
FIG. 4B is an exemplary perspective view of the object of FIG. 4A when viewed through a head wearable display and computing device.

Camera 17 is operable to take photos or videos, including enabling such images to be recorded and/or streamed for viewing by others, such as other individuals wearing corresponding eyewear devices 11. Still further, device 11 and camera 17 may incorporate or be useable with an optical recognition system or software for detecting features or characteristics of objects for verification of the proper completion of manual processes, with device 11 in turn displaying visual information to an individual 12 corresponding to such object. For example, when an individual 12 performing work on work piece 14 views the work piece 14, device 11 may be used to display visual information in the form of electronically generated overlays directing the assembly or inspection of work piece 14 via display 13. Such displayed information may then be visually laid over the work piece 14 to provide precise guidance to guide the actions of the individual 12 relative to the work being performed. Movement of the individual 12, and in turn of device 11 worn by the individual 12, is in turn tracked with the visual information displayed by display 13 being moved accordingly to maintain the orientation of the display relative to the object. FIGS. 4A and 4B illustrate an exemplary embodiment in which an object 14 is shown in FIG. 4A as it would be viewed without viewing through device 11 or without device 11 generating a visual image, and FIG. 4B discloses visual images 9a, 9b that may be viewable by a wearer of device 11 when viewing object 14, where visual images 9a, 9b are electronically generated overlays generated in response to information signals provided by controller 20. Of note, visual images 9a, 9b will be moved as displayed to wearer 12 to maintain their location with respect to object 14 upon movement by the wearer 12, such as via the location detection sensors and/or object recognition software or the like.

Although head wearable display device 11 is shown constructed in the form of eyeglasses, it should be appreciated that device 11 may be constructed in the manner of any form of headset or alternative construction, such as in the manner of a helmet or the like, that positions one or more displays in front of an eye or the eyes of a wearer. Moreover, although display 13 is disclosed as separate from the lens of the device 11, it should be appreciated that a lens itself may function as a display. A form of head wearable display device is the GOOGLE GLASS device provided by Google Inc., features of which are disclosed for example in U.S. Patent App. Pub. No. US 2013/0044042, which is hereby incorporated by reference. It should be understood, however, that the present invention is not limited to use with devices such as disclosed in U.S. Patent App. Pub. No. US 2013/0044042. For example, other alternative devices, sometimes referred to as "smart glasses" or "wearables" may be employed, such as the Moverio BT-200 provided by Epson.

Figure 2A:
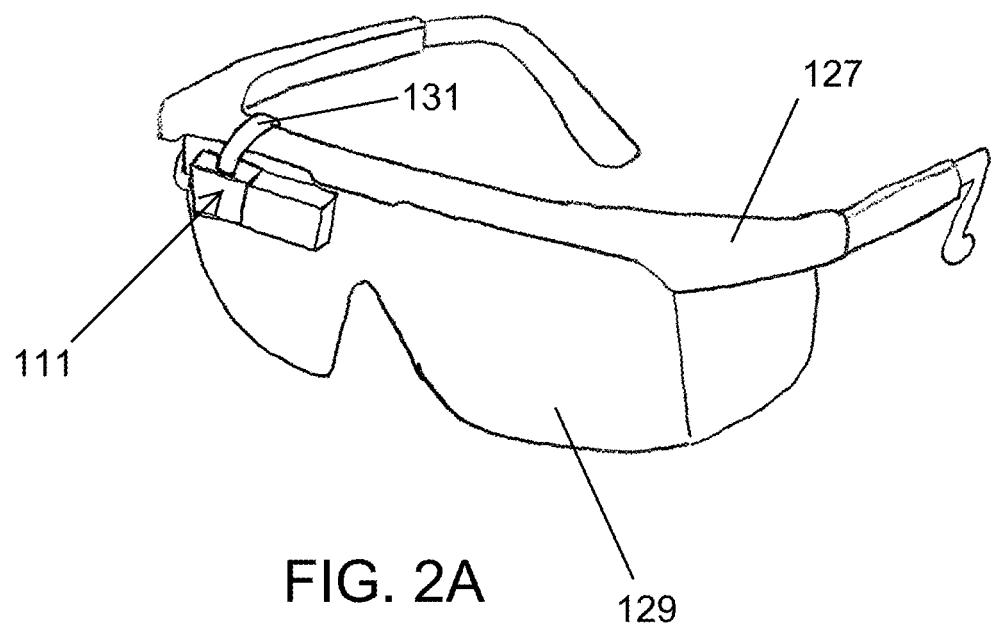
FIG. 2A is a perspective view of an alternative head wearable display and computing device.

Still further, an alternative wearable display device 111 is disclosed in FIG. 2A, wherein device 111 is substantially similar to device 11 in connection with operation in guide system 10. Device 111, however, is constructed as a clip-on attachment for use with conventional safety glasses, prescription eyeglasses, or helmets or other headwear that are worn in workplaces. Device 111 may be constructed to include sensors, cameras, microphones, displays and a projector as discussed above with respect to device 11. FIG. 2A discloses device 111 affixed to safety glasses 127 having lenses 129, with device 111 including one or more attachment members or elements, which in the illustrated embodiment comprise hooks or clips 131 that secure to the frame of safety glasses 127. It should be understood that alternative attachment members or elements may be employed to secure device 111 to an eyewear structure such as common factory safety glasses.

Figure 3:
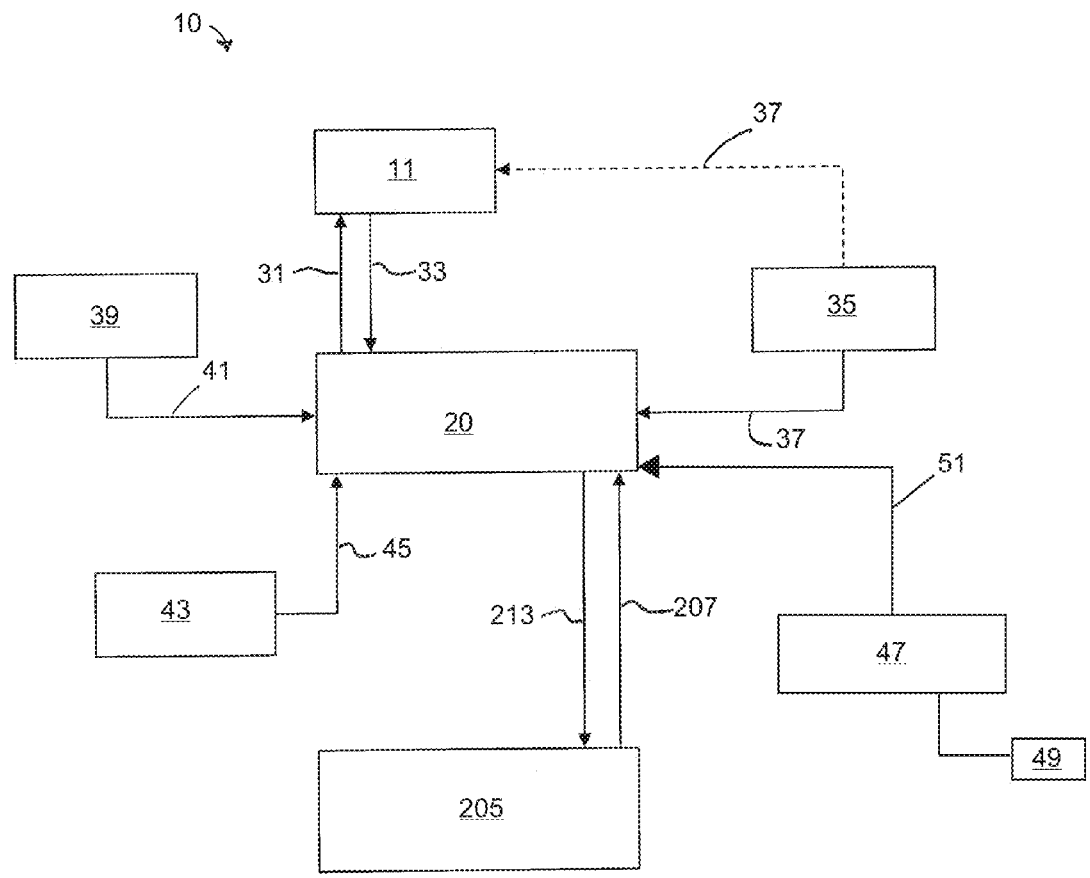
FIG. 3 is a schematic illustration of an eyewear operational guide system is accordance with the present invention.

In general, with reference to FIG. 3, eyewear operational guide system 10 provides visual information or indicators in the form of electronically generated overlay images to individual 12 via device 11 to direct or guide actions by individual 12. Such guided actions may include, but are not limited to step-by-step guidance involving assembly operations, part picking, part kitting, changeovers, training, or inspection operations, or any form of work on an object, such as a work piece 14. The guided actions may also include maintenance steps, cleaning operations, or surface preparations, or the like. Controller 20 provides information input signals 31 to device 11 controlling the visual information to be displayed for the particular actions required. Input signals 31 may also control the auditory information to be provided via device 11. Individual 12, via device 11, in turn provides signals 33 to controller 20, which signals 33 may comprise confirmation signals upon completion of a particular guided action to confirm completion of an action. Signals 33 may alternatively comprise output command signals prompting controller 20 to take certain actions. For example, output command signals may prompt controller 20 to provide various information requested by individual 12, such as drawings, instructional videos, work instructions, or the like. An output command signal may alternatively prompt controller 20 to back up to a previous visual display associated with a previous operational step, for example. Still further, an output command signal may be used to institute the recording of data by device 11, or enable the wearer's field of view to be shared with others.

Individual 12 may provide signals 33 to controller 20 in various ways, including for example, by way of contacting button 23 or touch pad 25. Still further, device 11 may detect actions by individual 12, such as eye blink(s), head tilting up, down, or side-to-side, hand gestures and specific hand movement, touch confirmation on the actual device 11 hardware, brain signal detection, and/or may employ voice step confirmation commands via microphone 21. Still further, one or more auxiliary devices or components 35 may be employed to provide signals 37 to controller 20 and/or wirelessly to device 11, such as, for example, a wristwatch or wristband device, or a hand held pendant device, or the like. Signals 37 may comprise information input signals, confirmation signals, or output command signals in the manner discussed above.

Eyewear operational guide system 10 may further include various sensors 39 for detecting aspects related to the work piece, structure, or area requiring guided actions, with sensors 39 in turn providing input signals 41 to controller 20. For example, sensor 39 may detect the presence and/or characteristics of an object, with the signal 41 provided to controller 20 in turn causing controller 20 to provide an associated information signal 31 to device 11. Sensor 39 may comprise, for example, a proximity switch, light curtain, photo eye, radio frequency identifier device, bar code reader, machine vision camera, or the like. System 10 may also include various confirmation sensors 43 that assist in detecting completion of a guided action and output a confirmation signal 45. This may include tools, such as torque guns and measuring devices, light curtains at part bins 34, part sensors, wired or wireless foot pedals and/or pushbuttons, and the like. Furthermore, either guide system 10 or sensors 39 could be utilized to detect and provide input confirmation to controller 20 that an operator has touched a certain area or part on the workstation in addition to detection that some body part has entered into a pre-configured detection area. Guide system 10 could also be used to monitor an operator's time viewing upon a certain area or their entire body presence in a certain area as a step confirmation before advancing to the next manual process step of light guidance.

Eyewear operational guide system 10 may be functionally employed with the guide systems disclosed in U.S. Pat. No. 7,515,981, U.S. Pat. Pub. No. US 2013/0325155 and/or international application publication no. WO 2012/109593, which are all hereby incorporated by reference in their entireties. In addition to or in place of projecting light sources, however, visual information provided to an individual 12 as part of eyewear operational guide system 10 may be provided by way of display 13 and/or auditory information may be provided by way of speaker 19. This includes, for example, displaying visual display features, cycle times, countdowns with the ability to change colors as the cycle time approaches critical pre-defined times, videos, drawings, and the like. It should be appreciated, however, that device 10 may be used in a standalone fashion or implemented with any combination of other hardware devices such as monitors, projectors, external sensors, parts bins, and the like.

Various operational and functional parameters of eyewear operational guide system 10 will now be discussed. System 10 further enables real time communication interface capability between operators and workstations using live communication, such as via multiple operators using devices 11. For example, a device 11 worn by one individual 12 could be used to either capture a video of a process step and auto-send to another individual 12 wearing another device 11 in a factory. Alternatively, a device 11 could provide a data stream, including over the internet, to a monitor or other device 11 for displaying what is in front of one operator or a live web cam for another operator to view in real time. Devices 11 could also record and store various versions of media files.

Device 11 may also be used to record, map and display work that has already been completed to ensure duplicate and redundant work is not performed. For example, device 11 may be used to create a visual picture of an area where work was needed in operations where it is not readily apparent that work has already been performed. Examples of such operations include cleaning or treating surfaces, such as sanitizing or washing surfaces, or mopping a floor. The virtual picture would be created via device 11 and provide a visual image via display 13 to indicate where work was created, such as via highlighting imagery. In such case, a follow-up operator could receive signals 31 from controller 20 displaying the highlighted imagery overlaid upon the work area to indicate where work has been completed versus not completed. Other technologies including, but not limited too, infrared devices could be used to provide input to device 11 in order to create the virtual picture. In addition, device 11 could be used to detect that, for example, a hospital employee has washed their wands for a pre-designated amount of time and that this safety step has not been missed with the appropriate automatic or manual confirmation of the step.

Eyewear operational guide system 10 may also be employed to monitor the times that an individual 12 is viewing select areas within a process or workstation 16 to utilize this data collection to improve the operating performance of the manual process. System 10 may also provide a notification to the individual 12 to direct their attention to the work area if their attention is directed elsewhere, such as for a time longer than a preset limit, and/or provide a notification when the time being taken to perform a task is over a desired cycle time. System 10 may also be used to randomize work tasks to increase operator focus by preventing operations from being predictable. Still further, system 10 may monitor, store, and display the physical positions of an individual 12 over time to collect data for optimizing movements involved with the processes using well known tools such as "spaghetti charts" and other operation motion optimization tools. Likewise, operation statistics for various individuals 12 may be recorded, such as cycle time performance, for targeting process improvements or the selection of trainers based on the collected data.

As noted, system 10 may further include the ability to provide real time adjustment of the visual information displayed by display 13, such as visual display features (VDFs) on a work piece, surface, or other object or area, to ensure that the VDFs lock into the appropriate location of the physical part and process as wearers of device 11 move their head and body during performance of the process. This may encompass the operative incorporation of an optical recognition system or software for detecting features or characteristics of objects.

Control module or controller 20, in the illustrated embodiment, is a computer controller device and as indicated is adapted to receive and send various signals to monitor and guide the assembly actions at work station 16. Control module 20 may be constructed as a desktop or laptop style PC, a PLC, an embedded computing system with a microprocessor or, or the like, or may be a networked computer system that may be used to control and monitor other aspects of the assembly line and work stations, or may be a wireless or wired computing device in the nature of a smart phone. It should be understood, however, that the control module may alternatively comprise a combination of interacting computer devices and still function as intended within the scope of the present invention. For example, a local computer device present at a particular work station may be adapted to receive and provide communication information with a network computer system associated with an assembly line, or other linked computer system. In addition, depending on system requirements and abilities, controller 20 may itself be integrally incorporated with device 11, in which case controller 20 is necessarily compact. Still further, eyewear operational guide system 10 may be a cloud-based system in which case controller 20 may represent a controller remote from the physical location of individual 12. Wireless downloads may also be automatically provided from manufacturing execution systems (MES), PLC, or Internet/cloud based systems for dynamic, real time, part-specific information such as loading programs, step confirmations, part tracking, bar codes and/or Vehicle Identification information (VIN), sequence numbers, help information, or the like.

Referring again to FIG. 3, eyewear operational guide system 10 may further be integrated or interfaced with an operational program system or operational software system or manufacturing execution system (MES) 205 whereby operational software system 205 may provide operational guide system 10 with input signals or data inputs 207 to create, control or cause specific visual information to be shown on display 13. Manufacturing, production, and/or assembly environments frequently employ operational software systems 205, which are sometimes referred to as enterprise resource planning (ERP) systems, used in association with product planning, production scheduling, inventory control, and the like. These systems are generally defined as control systems for managing and monitoring work-in-process in a factory environment, such as on a factory floor. Examples of such operational software systems include, but are not limited to, SAP® business software provided by SAP AG of Germany, PLEX cloud-based "Software as a Service" or SaaS in Troy, Mich., PROPLANNER® business software provided by Proplanner Corp. of Iowa, USA, as well as systems such as General Motor Corporation's Global Enterprise Production Information and Control System (GEPICS). Such operational software systems 205 can include data that may be utilized by guide system 10 to assist in guiding the activities of an individual without the necessity of having such information separately programmed or pre-programmed into guide system 10. For example, operational software system 205 may include part or component information, such as bill of material (BOM) information, including information categorized by part or product for separate operational steps in an assembly operation or the like, including part numbers and/or part descriptors, that may be transmitted to guide system 10. Operational software system 205 may also include ordered operational process descriptions as used, for example, for time and cost analysis purposes, which information may also be transmitted to guide system 200. Operational software system 205 may still further include blueprints or images of parts, components, decals, labels and the like that may be transmitted to guide system 10.

Accordingly, operational software system 205 may be interfaced with operational guide system 10 as shown in FIG. 3 whereby the data transmitted by operational software system 205 may be directly shown on display 13 or used in combination with information programmed into guide system 10 to create desired visual information for displaying on display 13. Data inputs 207 transmitted by operational software system 205, such as to controller 20 of system 10, may be used to create numerous display images, including part numbers, part descriptions, work instructions and/or graphics, such as images of parts, decals, or label.

Controller 20 may include software for controlling operation of guide system 10, with controller 20 receiving inputs from operational software system 205 directing use and placement of VDFs. For example, data inputs 207 transmitted from operational software system 205 related to part information may be used by guide system 10 to display a particular part number to an operator and/or may trigger guide system 10 to display an image relative to a particular location wherein a desired part is stored. Data inputs 207 from operational software system 205 related to sequential operational process descriptors may be displayed or used to display step-by-step work instructions to an operator for accomplishing a particular task. Graphical data inputs 207 from operational software system may be displayed or used by guide system 10 to display a depiction of a part, label, or decal, which may, for example, be displayed to help an individual correctly identify and/or position a particular item. Moreover, the data inputs 207 from operational software 205 may be used and projected with or combined with standard or programmed images.

Operational software 205 may receive signals for triggering the transmission of data inputs 207. For example, such signals may be received by software 205 from sensors that detect the completion of an action, from device 11, or otherwise. Controller 20 itself may transmit signals 213 to software 205 for trigging a subsequent data input signal 207.

Still further, controller 20 may include a VDF address table or listing, such as disclosed in U.S. Pat. App. Pub. No. US 2013/0325155, with the controller 20 correspondingly including numerous pre-programmed VDFs that are each assigned a unique identifier, such as an alpha and/or numeric identifier. In addition to textual VDFs, the VDF address table may include images, videos, and drawings. Each unique VDF contains unique characteristic and combination of characteristics including, but not limited to, color, font size, font type, width, height, rotation angle, animation type, alphanumeric code, audio instruction, etc.

Thus, in operation, guide system 10 may be prompted to display a particular VDF based on an address identifier on display 13 of a given or particular device 11. Accordingly, guide system 10 may be dynamically used to display selected VDFs via its associated VDF address identifier. This operational approach simplifies the use and employment of guide system 10 by enabling flexible programming to guide system 10, including as may be required due to product and model changes.

Individuals wearing devices 11 may also be provided with real time operating performance on key metrics associated with operations that they are performing. Key metrics may include, but are not limited to, cycle time for operations that are being performed, and quality or accuracy metrics, including by way of comparisons to other workers. These may include the frequency of missteps, or the like. Still further, system 10 may react to operator performance by proposing recommended process changes to the individual 12 wearing device 11, and/or change work requirements based on, for example, the number of mistakes made, such as through a statistical analysis of the operator's performance.

System 10 may also operate to display cooperative work instructions or other graphical information to multiple individuals 12 wearing devices 11. In such an embodiment, system 10 may divide up tasks according to the number of operators present at a given work area or location and/or their relative performance. For example, if one or more individuals 12 are working in an area, such as sweeping a floor, or performing assembly operations on an object, or otherwise, and one or more additional individuals 12 join the original group, system 10 can divide the responsibilities and provide the appropriate visual guidance steps to all of those individuals present. System 10 can also track what operations have been completed for providing guidance to subsequent actions to be performed by the individuals 12.

Still further, device 11 may also include indicators for others to observe the status of individual 12 wearing the device 11. Such indicators may include lights, such as LEDs, that, for example, display green when work is being performed correctly or yellow when assistance is required. A speaker may alternatively or additionally be used to provide an audible indication.

Guide system 10, such as via device 11, may also be used to trigger other devices to activate, deactivate, or change their state or displays, such as by way of Wi-Fi or Zigbee communications. For example, device 11 can alert lighting systems that the operator is looking into a particular room and cause the room lights to turn on. If the operator is engaged in an inspection operation, the device may turn on addition specific lighting to aid in the inspection process only when that lighting is needed. The device may enable a torque gun after setting a particular program with specific torque and/or angle requirements in the torque gun controller, only when the operator is at a point in their work when it is right and proper to use the torque gun, even up to the point of verifying that the operator has the torque gun positioned on the correct bolt in the correct hole in the correct sequence before enabling the operation of the torque gun. The confirmation capability of system 10 would not guide the operator to the next step unless the proper torque and angle specification had been met for the previous step.

Device 11 can be used to detect when a wearer is looking at a monitor, projector display area, or other display on a phone, tablet, or the like, and cause it to display information for the operator. This monitor or other display can show images recorded from the device, work instructions that were on the device and which the operator would rather transfer out of his or her field of view, or other information that serves the operator.

The device can use direct information displayed in the operator's field of view or indirect information such as colors, or blinking lights outside of the field of view. The device may also use a fade, dimming, or shading effect in eyewear to convey information in lieu of adding images to the field of view. The device may operate on one or both eyes depending on the application. Another implementation may be for the device to project light onto the underside of the wearer's hat so that it is visible to the wearer.

The device may be used to determine when the operator is performing their work for the purposes of compensating the operator for hourly work. For example, a delivery truck driver may be considered to be working when wearing this device with it turned on and be considered to be on an unpaid break when he or she takes it off or turns it off.

The work instructions for the operator may be on an exception basis. That is, there may not be any displayed information, or minimal displayed information while the operator is found by the device or other means to be doing the proper work. Only when a mistake or other problem occurs, the device would display information to alert the operator of the issue and possibly help the operator recover from the issue to ensure the part or process is performed per specifications.

The use of audio may include beeps, tones, or music that function as coded information. The audio may also be verbal instructions that were recorded by a person or synthesized by a text-to-speech or other algorithm. Examples of information conveyed by audio includes, but is not limited to, confirmation of a step done correctly, alert of a mistake, notification that another part is ready at the station for the operator to begin work, verbal instructions or warnings about the current step, left or right audio signifying that the operator needs to turn his or her head left or right, or changing pitch or tempo that helps the operator maintain movement of a hot glue gun at the proper speed.

The device may have an easy program mode, where the operator can quickly take pictures or videos, and record audio as audio or automatically transcribed into text or other electronic forms that will serve as work instructions to be displayed when similar work will be done in the future. As an example, an operator maintaining a pump that will not need to be maintained again for a year would be able to capture all of the relevant and/or tricky aspects of the job and play them back when he/she or another operator returns a year later.

As further shown in FIG. 3, guide system 10 may additionally be used with or incorporate an inspection system, such as vision system 47 having one or more cameras 49. Vision systems 47 are conventionally used, for example, to inspect parts, assemblies or the like for conformance with specified criteria. In conjunction or operation with guide system 10, vision system 47 may be used to inspect one or more, or all, of the operational steps being performed by an individual, such as by a wearer 12 of device 11 that is being prompted via images provided via device 11 to perform various steps. Vision system 47 is operatively connected with controller 20, as shown in FIG. 3, whereby vision system 47 is configured to cooperatively communicate with controller 20 for inspecting and providing communication to an operator.

For example, vision system 47 via camera 49 viewing an object 14 may either operate to inspect the performance of a guided step or task while being performed by an individual 12, or after the individual 12 causes a confirmation signal 33 or 37 to be transmitted to indicate the individual's believed completion of the step or task. If vision system 47 determines the step to have been performed properly, vision system 47 can cause a signal 51 indicating as such to controller 20, in which case controller 20 can then provide a subsequent information signal 31 for any additional steps required to be performed by the individual 12, or can release the object 14 from the operational step if work thereat is completed.

Figure 5:
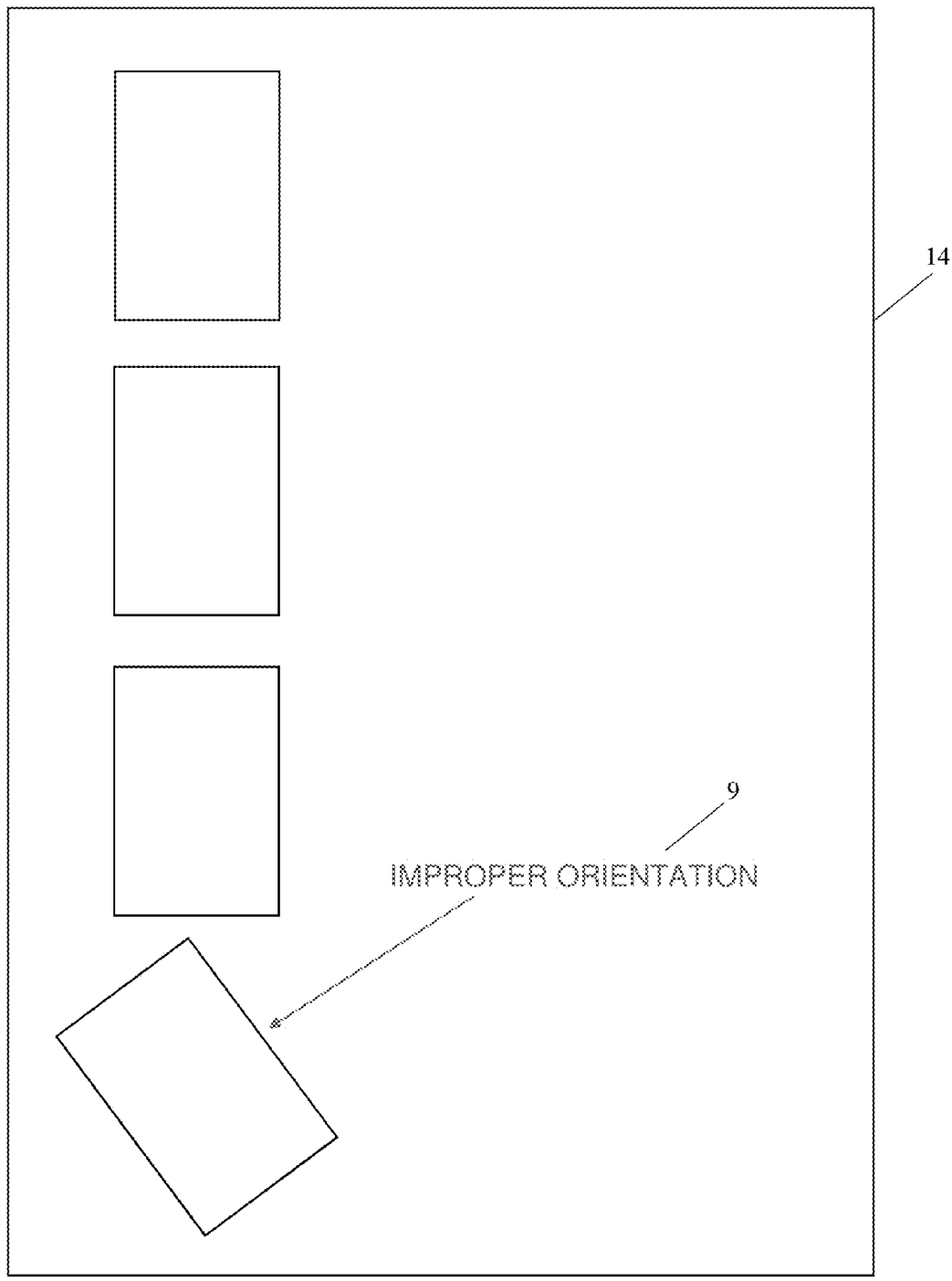
FIG. 5 discloses the eyewear operational guide system of FIG. 3 with the vision system detecting a nonconformity and the guide system providing images to an individual regarding the nonconformity.

If, however, the vision system 47 via camera 49 viewing an object 14 determines that one or more steps or actions were not performed or were not performed properly such that object 14 is deemed by vision system 47 to be nonconforming, vision system 47 can cause a signal 51 indicating as such to controller 20. In response to a signal 51 indicating a nonconformity, controller 20 can then provide additional information signals 31 to device 11 providing images to individual 12 to take corrective or remedial action. For example, if the individual either misses assembling a part, or misassembled a part, to the object 14, guide system 10 can provide VDFs to the individual 12 in the form of electronic images viewable via device 11 to instruct the individual 12 of the location of the nonconformity, including that the part is missing or that it is misassembled. Still further, electronic images can be provided specifically directed toward the nonconformity. FIG. 5 illustrates, for example, the assembly of various components to object 14, with an image 9 being provided to an individual notifying the individual that one of the components was assembled with an improper orientation. The image can include an arrow, as shown, but may alternatively provide one or more colored images overlaying or illuminating the improperly oriented component, showing the actual dimension or other geometrical feature compared to current, projecting a calculated variance between an actual to standard dimension, or the like.

Upon the individual 12 correcting the nonconformity, the individual 12 would then provide a subsequent confirmation signal 33 and, if the vision system 47 determines the object 14 to be in conformance, vision system 47 can then again cause a signal 51 to be provided to controller 20 indicating such conformity. Although shown as a separate vision system 47 and camera 49, the vision system and camera may integrated with head wearable display device 11 with the camera 17 of device 11 operating as the vision system camera and the controller 20 operating as the vision system processor.

Although vision system 47 is illustrated in connection with guide system 10 employing head wearable device 11, it should be appreciated that vision system 47 may be incorporated with guide systems such as disclosed in U.S. Pat. No. 7,515,981, U.S. Pat. Pub. No. US 2013/0325155 and/or international application publication no. WO 2012/109593. In such an embodiment, the vision system would communicate with the controller or control module of the guide system, such as in response to a confirmation signal entered by the user. The guide system may then project images utilizing light projected from light sources where rather than the generation of virtual overlay in association with device 11, the light sources would project light directly onto the object. These images would direct the individual's attention to the location and identify the problem of the detected nonconformity, and/or provide images instructing the individual what to do to correct the nonconformity. In similar manner to that discussed above with regard to guide system 10, such an alternative guide system would then enable the individual to progress with subsequent steps, or release the part from the operation, upon confirmation from the vision system that the object is in conformity to the pre-established requirements.

It should also be appreciated that various above discussed features disclosed in connection with guide system 10 employing head wearable device 11 may be employed with guide systems such as disclosed in U.S. Pat. No. 7,515,981, U.S. Pat. Pub. No. US 2013/0325155 and/or international application publication no. WO 2012/109593. For example, such an alternative system may utilize a separate or remote light source to project light onto a surface to create a virtual fixturing of components by creating geometrical outline images of the individual components, such as shown at 8*a* in connection with FIG. 1N, with an operator then placing into each outline the appropriate part for subsequent assembly. A separate or remote light projector may also be used to project a nonconformity indicia image or images, such as shown in FIG. 1O, comprising an arrow and/or text generated in response to a testing or check of the operator action, such as in response to a vision system, measuring sensor, or other device. A separate or remote light projector may be used to project a guided route image, such as shown at 8*b* in FIG. 1P, for dispensing a glue bead onto an object, laying down a wiring harness, applying a welding bead, wiping down a target area, or the like. A separate or remote light projector may also be used to project a virtual pushbutton image, such as shown at 8*c* in FIG. 1Q, where the virtual pushbutton image is generated on a surface that is within a field of view of a vision system, with the vision system detecting the operator touching or passing their hand over the pushbutton image and the vision system detecting such action for generation of a confirmation signal to either complete the action and/or advance system 10 to the next action.

Changes and modifications in the specifically described embodiments can be carried out without departing from the principles of the present invention which is intended to be limited only by the scope of the appended claims, as interpreted according to the principles of patent law including the doctrine of equivalents.

We claim:

1. A method of guiding actions of an individual, said method comprising:
    providing a guide system having a guide system controller and a plurality of head wearable display devices, said head wearable display devices each including a display that is generally transparent and viewable by an individual wearing one of said head wearable display devices, and including a camera operable to image the field of view of an individual wearing one of said head wearable display devices;
    providing information signals from said guide system controller to said head wearable display devices;
    presenting visual images on said displays of said head wearable display devices corresponding to said information signals, with said images being viewable by an individual with said visual image providing operational instruction guidance to the wearer to perform an action on a physical object or surface, wherein said visual image is electronically generated and virtually over laid on the physical object or surface when viewed through said display;
    providing a confirmation signal to said guide system controller upon completion of an action associated with said presenting of a visual image; and
    wherein images captured by said camera of one of said head wearable display devices are displayable on one or more other said head wearable display devices.

2. The method of claim 1, wherein said confirmation signal is provided to said guide system controller via an action taken by the wearer, wherein said confirmation signal is provided to said guide system controller by at least one of (i) movement of said head wearable display device, (ii) a button on said head wearable display device, (iii) a touchpad on said head wearable display device (iv) a microphone on said head wearable display device.

3. The method of claim 1 further comprising providing a sensor apparatus, wherein said sensor apparatus is operable to detect completion of the action and wherein said sensor apparatus generates said confirmation signal.

4. The method of claim 1, further comprising selectively providing information signals from said guide system to divide the required actions between the individuals wearing said head wearable display devices according to the number of individuals present.

5. The method of claim 1, further including assigning a said head wearable display device to an individual, and wherein said system tracks qualifications of individuals to perform particular actions, and wherein said method comprises providing information signals to said head wearable display device based on the wearer's qualifications to perform actions associated with said information signals.

6. The method of claim 1, further comprising monitoring the performance of an individual wearing said head wearable display device with a vision system, said method further comprising providing a signal from said vision system to said guide system controller in response to said monitoring the performance of an individual, and wherein said signal from said vision system to said guide system indicates at least one of (i) detection of a nonconformity and (ii) no detection of a nonconformity.

7. The method of claim 6, wherein in response to detection of a nonconformity by said vision system, said method further comprises providing information signals from said guide system controller to said head wearable display device presenting a visual image on said display corresponding to the nonconformity.

8. The method of claim 1, further comprising recording the time duration with said guide system controller while an individual is guided by said guide system to complete an action.

9. The method of claim 1, further comprising recording the time duration with said guide system controller a said head wearable display device is oriented in a particular orientation.

10. The method of claim 1, wherein said visual image comprises at least one selected from the group consisting of numbers, words, alphanumeric characters, a drawing image and a video image.

11. The method of claim 1, further comprising providing a notification to an individual wearing said head wearable display device.

12. The method of claim 1, further comprising providing a subsequent information signal from said guide system controller to said head wearable display device in response to said confirmation signal, and displaying a visual image on said display corresponding to said subsequent information signal that is viewable by the individual.

13. A guide system adapted to provide visual indicators to an individual to guide actions, said guide system comprising:
   a head wearable display device, said head wearable display device including a display with said display being viewable by an individual wearing said head wearable display device and upon which visual images are presentable to the individual, said head wearable display device further including a camera operable to image the field of view of the wearer of said head wearable display device;
   a guide system controller operable to provide an information signal to said head wearable display device;
   said display being operable to present a visual image corresponding to said information signal that is viewable by the individual, wherein said display is generally transparent and said visual image is over laid on a physical object or surface at a particular location relative to the physical object or surface when viewed through said display, wherein said visual image provides an operational instruction to the individual to guide actions of the individual, and wherein said visual image moves on said display as the individual moves to maintain the particular location of said visual image on the physical object or surface when viewed through said display to maintain the location of said visual image relative to the physical object or surface with respect to the view of the individual.

14. The guide system of claim 13, wherein said head wearable display device is operable to provide a confirmation signal to said guide system controller upon completion of an action associated with said visual image.

15. The guide system of claim 14, wherein head wearable display device comprises for providing said confirmation signal at least one of (i) sensors to detect movement of said head wearable display device, (ii) a button, (iii) a touchpad, (iv) a microphone, and (v) a camera.

16. The guide system of claim 13, further comprising a sensor apparatus separate from said guide system controller, and wherein said sensor apparatus is operable to provide signals to said guide system controller, and wherein said input signal is provided to said guide system controller based on said signals received by said system controller from said sensor apparatus.

17. The guide system of claim 13, wherein said guide system controller records the time duration said head wearable display device is oriented in a particular orientation.

18. The guide system of claim 13 wherein said guide system controller records images and time durations while an individual is guided by said guide system.

19. A method of guiding actions of an individual, said method comprising:
   providing a guide system having a guide system controller and a head wearable display device, said head wearable display device including a display that is viewable by an individual wearing said head wearable display device;
   providing an information signal from said guide system controller to said head wearable display device;
   presenting a visual image on said display corresponding to said information signal that is viewable by the individual with said visual image providing guidance to the wearer to perform an action, wherein said display is generally transparent and said visual image is electronically generated and virtually over laid on a physical object or surface at a particular location relative to the physical object or surface when viewed through said display, wherein said visual image provides an operational instruction to the individual to guide actions of the individual;
   moving said visual image on said display as the individual moves to maintain the particular location of said visual image on the physical object or surface when viewed through said display to maintain the location of said visual image relative to the physical object or surface with respect to the view of the individual;
   recording the time duration while an individual is guided by said guide system to complete an action associated with said presenting a visual image; and
   providing a confirmation signal to said guide system controller upon completion of the action associated with said presenting a visual image.

20. The method of claim 19, further comprising recording the time duration said head wearable display device is oriented in a particular orientation.

* * * * *